United States Patent
Zeng et al.

(10) Patent No.: US 11,953,114 B2
(45) Date of Patent: Apr. 9, 2024

(54) AIR VALVE WITH SMA FOR SWITCHING

(71) Applicant: TangTring Seating Technology Inc., Huizhou (CN)

(72) Inventors: Jian Zeng, Huizhou (CN); Jun Xie, Huizhou (CN); Qing-Yi Feng, Huizhou (CN)

(73) Assignee: TANGTRING SEATING TECHNOLOGY INC., Huizhou Guangdong (CN)

( * ) Notice: Subject to any disclaimer, the term of this patent is extended or adjusted under 35 U.S.C. 154(b) by 109 days.

(21) Appl. No.: 17/878,455

(22) Filed: Aug. 1, 2022

(65) Prior Publication Data
US 2023/0392705 A1  Dec. 7, 2023

Related U.S. Application Data

(63) Continuation-in-part of application No. 17/829,932, filed on Jun. 1, 2022.

(51) Int. Cl.
*F16K 31/00* (2006.01)
*F16K 27/02* (2006.01)

(52) U.S. Cl.
CPC ............ *F16K 31/002* (2013.01); *F16K 27/02* (2013.01)

(58) Field of Classification Search
CPC . F16K 31/025; F16K 31/002; F16K 31/52408
See application file for complete search history.

(56) References Cited

U.S. PATENT DOCUMENTS

| | | | | |
|---|---|---|---|---|
| 1,011,756 | A * | 12/1911 | Dalen | F16K 31/025 431/18 |
| 7,484,528 | B2 * | 2/2009 | Beyerlein | F16K 31/002 137/625.2 |
| 9,512,829 | B2 * | 12/2016 | Alacqua | F16K 31/44 |
| 9,630,560 | B2 * | 4/2017 | Alacqua | B60R 1/087 |
| 9,970,564 | B2 * | 5/2018 | Dankbaar | B60N 2/976 |
| 10,753,494 | B2 * | 8/2020 | Beuschel | F16K 11/052 |
| 10,890,268 | B2 * | 1/2021 | Dörfler | F16K 31/025 |

(Continued)

FOREIGN PATENT DOCUMENTS

| | | |
|---|---|---|
| CN | 104685210 B | 11/2016 |
| CN | 109296807 A | 2/2019 |

(Continued)

*Primary Examiner* — Umashankar Venkatesan
(74) *Attorney, Agent, or Firm* — Muncy, Geissler, Olds & Lowe, P.C.

(57) ABSTRACT

An air valve with a SMA wire for switching is located in an air chamber in which at least two air holes are formed. The air valve comprises a base, an air piston, a driving component, and the SMA wire. The base is provided with two supporting blocks, and two conduction components near one of the two supporting blocks. The air piston determines a ventilation state of one of the two air holes. The air piston comprises a rod body on the two supporting blocks and with a first triggering part, and a spring sleeved on the rod body. The driving component is sleeved on the rod body and with a second triggering part matched with the first triggering part. The SMA wire is connected with the two conduction components and the driving component, and is turned by the supporting block opposite to the two conduction components.

10 Claims, 7 Drawing Sheets

(56) References Cited

U.S. PATENT DOCUMENTS

| | | | | |
|---|---|---|---|---|
| 10,995,873 B2* | 5/2021 | Mitzler | ............... | B60N 2/914 |
| 11,077,781 B2* | 8/2021 | Beuschel | ............... | B60N 2/914 |
| 11,236,839 B2* | 2/2022 | Beuschel | ............... | F16K 31/002 |
| 11,536,256 B2* | 12/2022 | Dankbaar | ............... | F16K 1/36 |
| 11,635,154 B2* | 4/2023 | Beuschel | ............... | B60N 2/643 |
| | | | | 297/284.1 |
| 11,730,308 B2* | 8/2023 | Butera | ............... | A47J 31/0615 |
| | | | | 99/289 R |
| 11,781,669 B1* | 10/2023 | Wen | ............... | F16K 31/025 |
| | | | | 251/11 |
| 2004/0104580 A1* | 6/2004 | Spiessl | ............... | D06F 37/42 |
| | | | | 292/84 |
| 2016/0157669 A1* | 6/2016 | Andreis | ............... | A47J 31/461 |
| | | | | 222/129.1 |
| 2018/0038514 A1* | 2/2018 | Kuszneruk | ............... | F16K 99/0044 |
| 2023/0131889 A1* | 4/2023 | Sturm | ............... | F16K 31/02 |
| | | | | 251/366 |

FOREIGN PATENT DOCUMENTS

| | | |
|---|---|---|
| CN | 109386642 A | 2/2019 |
| CN | 110345304 A | 10/2019 |
| CN | 111668612 A | 9/2020 |

* cited by examiner

AIR VALVE WITH SMA FOR SWITCHING

CROSS REFERENCE TO RELATED APPLICATIONS

This application is a Continuation-in-Part of co-pending application Ser. No. 17/829,932, filed on Jun. 1, 2022, for which priority is claimed under 35 U.S.C. § 120; the entire contents of all of which are hereby incorporated by reference.

FIELD OF THE INVENTION

The present invention relates to an air valve, and particularly relates to an air valve controlled by an SMA wire.

BACKGROUND OF THE INVENTION

Through investigation, an Shape Memory Alloy (SMA) is a metal alloy with an Shape Memory Effect (SME); the SMA is in a martensite structure when the temperature of the SMA is lower than the phase inversion temperature (such as room temperature); and the metallographical structure enables the SMA to deform after accepting the action of external force and can still keep a deformed state after the external force is removed, and the phenomenon is called the SME. When the SMA is heated to be higher than the phase inversion temperature, the metallographical structure of the SMA is transformed from the martensite structure into an austenite structure, and through the change of the metallographical structure, the SMA releases stress and recovers to an original state before deformation. At present, the SME of the SMA is widely applied to a actuate valve component, and a metal alloy wire is shrunk after being electrified and heated, so that the valve component can release or close a valve port according to an electrified state of the metal alloy wire.

Chinese patent no. CN 104685210B discloses a technology for actuating a piston by an SMA wire and discloses a mechanical driver, which comprises a wedge-shaped component, a control rod arranged on the wedge-shaped component and enabling the wedge-shaped component to generate relative displacement, a piston driven by the control rod, and an SMA connected with the wedge-shaped component. The SMA is shrunk and drives the wedge-shaped component when the SMA is conducted, and the wedge-shaped component pushes the control rod to move, so that the piston releases a valve port. When the SMA is not conducted, the wedge-shaped component returns and drives the control rod, so that the piston closes the valve port. The mechanical driver disclosed by the patent is complex in structure and is unfavorable for assembly.

Furthermore, Chinese patent nos. CN 109296807B, CN 109386642A, CN 110345304A, CN 111668612A and so on disclose another technology for actuating a valve by an SMA. By taking the patent CN 109296807B as an example, the valve is provided with a valve housing, an executive component arranged in the valve housing, an SMA wire arranged in the valve housing and acted on the executive component, a group of resetting components connected with the executive component, and a circuit board, on which the SMA wire is arranged; a valve opening is formed in the valve housing; when the SMA wire is not electrified, the executive component is configured to close the valve opening; when the SMA wire is electrified, the SMA wire is shortened and presses the executive component downwards, so that the executive component compresses the resetting components and releases the valve opening; and when the SMA wire recovers to be not electrified again, the executive component is pushed against by the resetting components to close the valve opening again. The executive component disclosed by the Chinese patent no. CN 109296807B is vertically arranged on the circuit board, and the displacement stroke of the executive component is parallel to the SMA wire, so that the height of the valve housing habitually used is limited to the executive component and cannot be shrunk specifically.

SUMMARY OF THE INVENTION

The present invention mainly aims to solve the problem that a valve implemented by an SMA wire and used habitually is complex in structure.

The present invention mainly aims to solve the problem that the valve implemented by the SMA wire and used habitually cannot be shrunk specifically.

In order to achieve the above purposes, the present invention provides an air valve with SMA for switching. The air valve is located in an air chamber, and at least two air holes are formed in the air chamber. The air valve comprises a base, an air piston, a driving component and an SMA wire. The base is provided with at least two supporting blocks arranged at an interval, and two conduction components located at the same side of the base and near one of the two supporting blocks. The air piston is arranged at the air chamber along an axial direction and is used for determining a ventilation state of at least one of the two air holes; the air piston comprises a rod body arranged on the two supporting blocks, and a spring sleeved on the rod body; the rod body is provided with a first triggering part; and one end of the spring pushes against one of the two supporting blocks, and the other end of the spring pushes against the rod body. The driving component is sleeved on the rod body and is provided with a second triggering part matched with the first triggering part; the SMA wire comprises two connecting segments respectively connected with the two conduction components, two actuating segments respectively extending from the two connecting segments and connected with the driving component, and a turning segment connected with the two actuating segments and turned by one of the two supporting blocks, which is opposite to the two conduction components; when the SMA wire is electrified, the SMA wire applies actuating force to the driving component; the direction of the actuating force is staggered with the axial direction of the air piston; and the air piston generates displacement due to the action of the driving component, so as to switch the ventilation state of at least one of the two air holes.

In one embodiment, the rod body is provided with a first inclined plane arranged on the first triggering part, and the second triggering part is provided with a second inclined plane which is in contact with the first inclined plane.

In one embodiment, the driving component is provided with two first side edges that are parallel to the air piston, and two connecting arms arranged on the two first side edges, and the two actuating segments of the SMA wire are arranged on the two connecting arms respectively.

In one embodiment, each of the two connecting arms comprises a first part located at one of the two first side edges, and a second part extending from the first part and being displaced along the edge of the base when the driving component moves.

In one embodiment, the base is provided with two notches formed in projecting positions of the two connecting arms.

In one embodiment, the base is provided with two second side edges that are parallel to the air piston, and a plurality of auxiliary walls arranged on the two second side edges respectively; and the two actuating segments of the SMA wire are respectively located at one side of each of the auxiliary walls facing to the air piston.

In one embodiment, one of the two supporting blocks, which is opposite to the two conduction components, is provided with a limiting bump used for limiting the position of the turning segment.

In one embodiment, the air valve is provided with a reed located at one side of the base; the base is provided with an opening formed correspondingly to the reed; the driving component is provided with a column facing to the opening; and when the driving component accepts the actuating force and generates displacement, the column compresses the reed through the opening.

In one embodiment, the driving component is provided with a space for disposal of the rod body therein, and a cross section of the space is a rectangle.

In one embodiment, the base is provided with a bump for supporting the first triggering part.

Through the above implementation of the present invention, compared with the habitual use, the air valve has the following characteristics: the driving component is controlled by the conduction state of the SMA wire, and the direction that the driving component applies the actuating force to the air piston is staggered with the axial direction of the air piston, so that the assembling space required by the structure of the air valve is reduced. Additionally, the SMA wire takes one of the two supporting blocks as a supporting point of turning; and the single SMA wire can generate the driving effect which is the same as that of two SMA wires, and the influence of passing of air flow on the SMA wire is reduced.

DETAILED DESCRIPTION OF THE PREFERRED EMBODIMENTS

Figure 1:
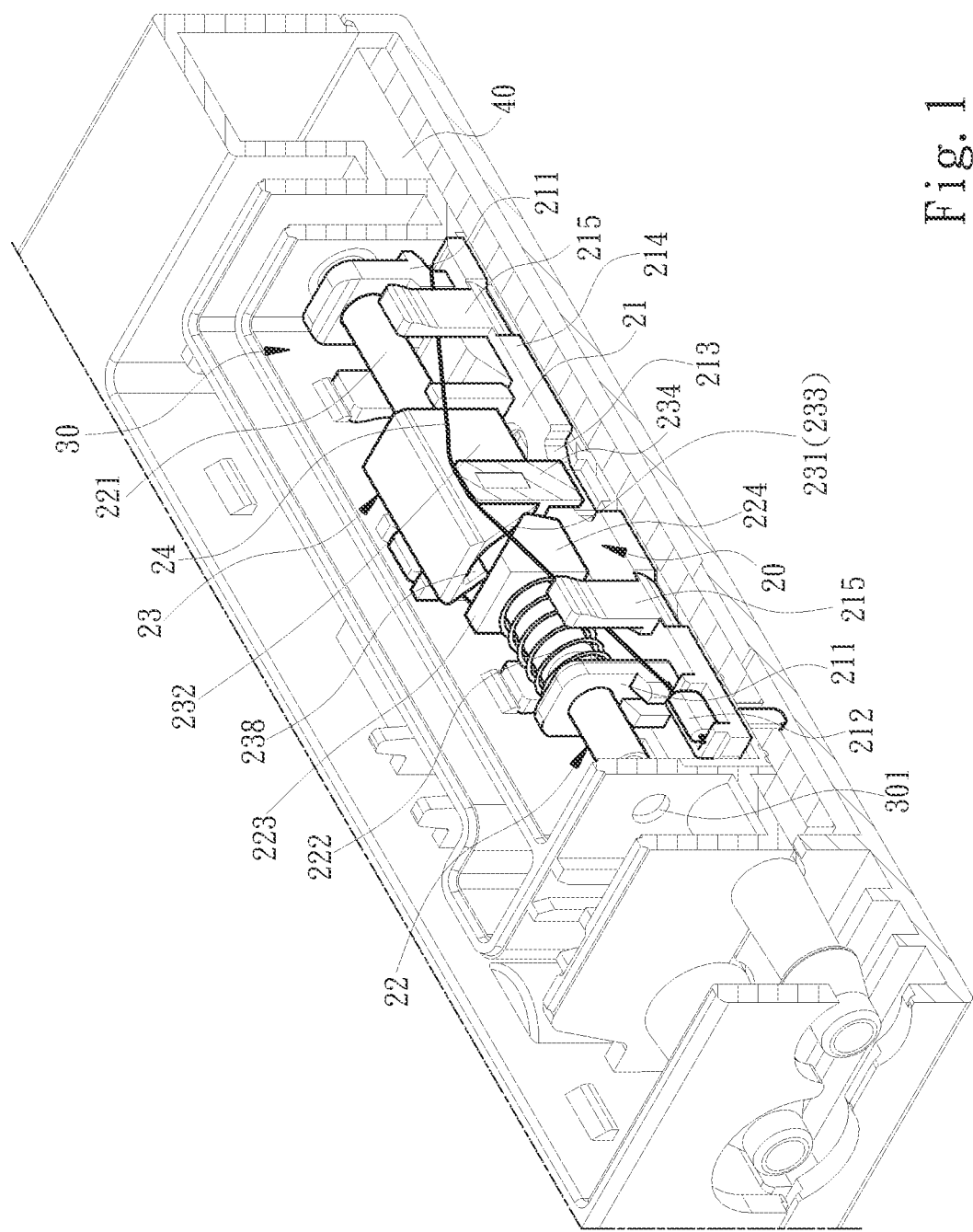
FIG. 1 is a schematic diagram of an implementation structure in one embodiment of an air valve of the present invention.

The detailed descriptions and the technical contents of the present invention are described as follows through combination with the drawings:

With reference to FIG. 1, FIG. 2, FIG. 3, FIG. 4, FIG. 5, FIG. 5, FIG. 6 and FIG. 7, the present invention provides an air valve with an SMA for switching. The air valve 20 is located in an air chamber 30, and at least two air holes 301 are formed in the air chamber 30. The air chamber 30 is connected with an air bag structure, and a ventilation state of at least one of the two air holes 301 determines whether the air bag structure is inflated, deflated or retained.

The air valve 20 comprises a base 21, an air piston 22, a driving component 23 and an SMA wire 24, wherein the base 21 is provided with at least two supporting blocks 211 arranged at an interval, and two conduction components 212 located at a side same as the base 21 and near one of the two supporting blocks 211. The air piston 22 is arranged at the air chamber 30 along an axial direction and determines the ventilation state of at least one of the two air holes 301. The air piston 22 comprises a rod body 221 arranged on the two supporting blocks 211, and a spring 222 sleeved on the rod body 221. One end of the rod body 221 is arranged to face at least one of the two air holes 301, and an movement of the rod body 221 changes the ventilation state of at least one of the two air holes 301, wherein the ventilation state refers to that at least one of the two air holes 301 is closed, or at least one of the two air holes 301 is capable for a fluid passing through. Additionally, the rod body 221 is provided with a first triggering part 223. One end of the spring 222 pushes against one of the two supporting blocks 211, and the other end of the spring 222 pushes against the rod body 221. The driving component 23 is sleeved on the rod body 221 and is provided with a second triggering part 231 matched with the first triggering part 223 and two first side edges 232 that are parallel to the rod body 221 of the air piston 22.

Figure 3:
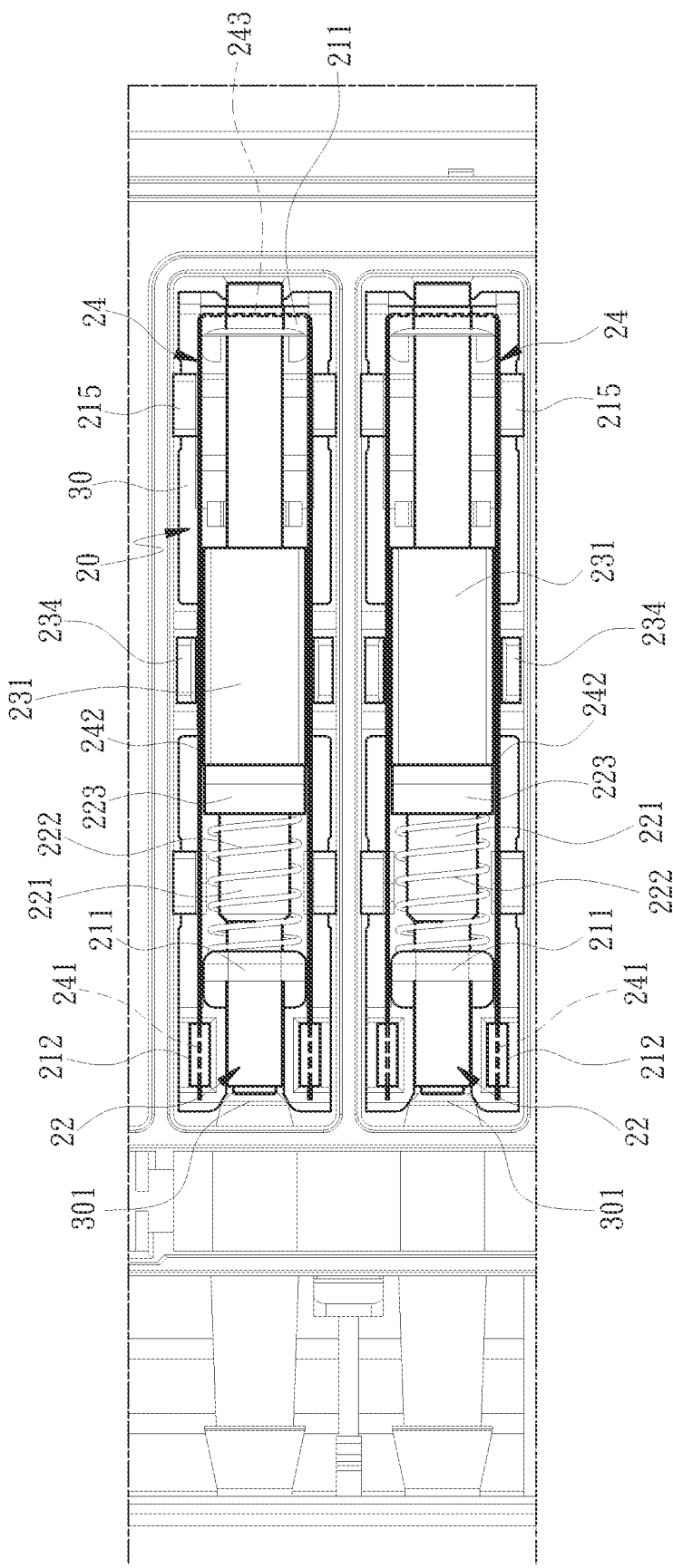
FIG. 3 is a top view of an implementation structure in one embodiment of the air valve of the present invention.
Figure 4:
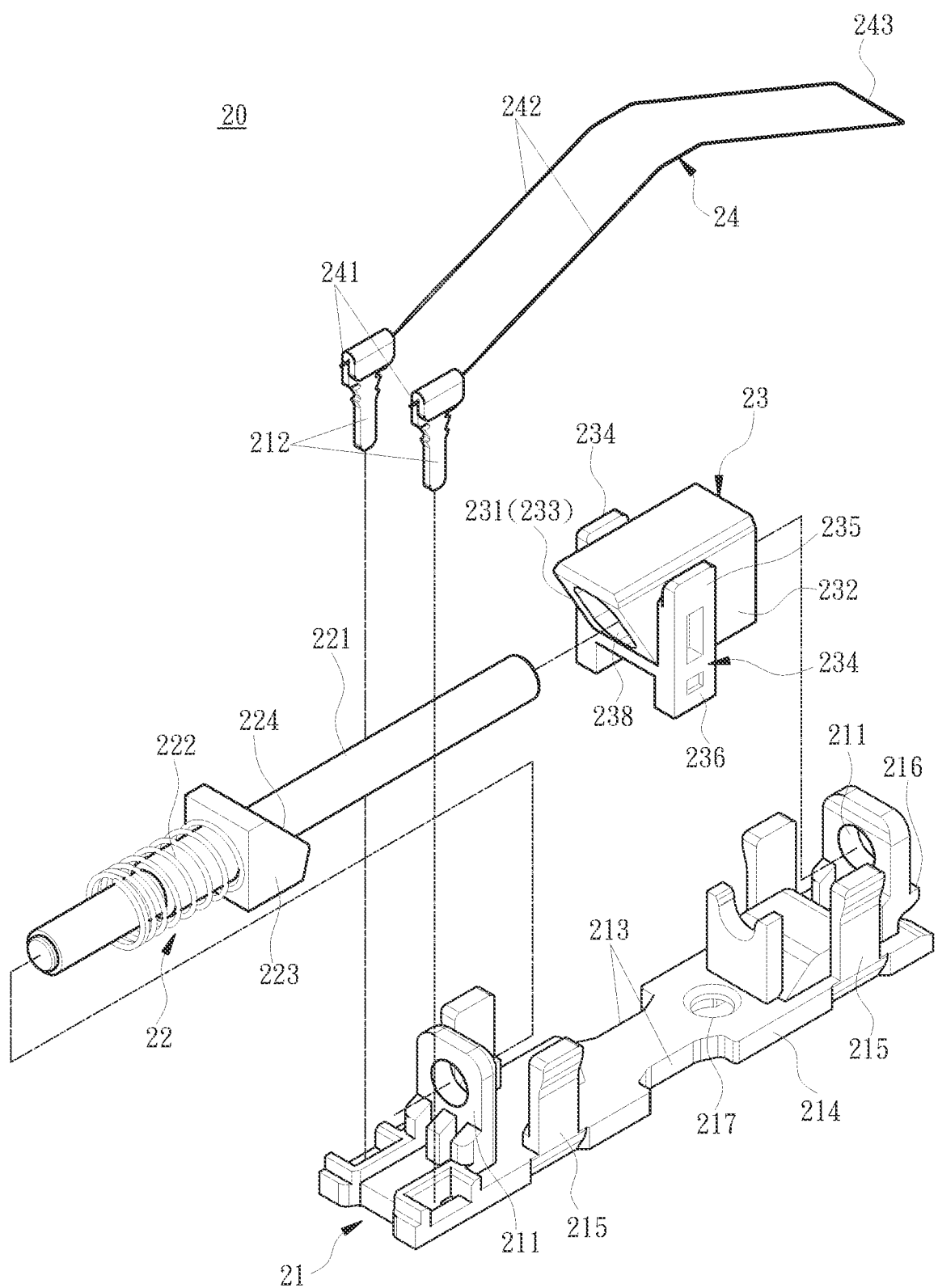
FIG. 4 is an exploded view of a structure in one embodiment of the air valve of the present invention.
Figure 7:
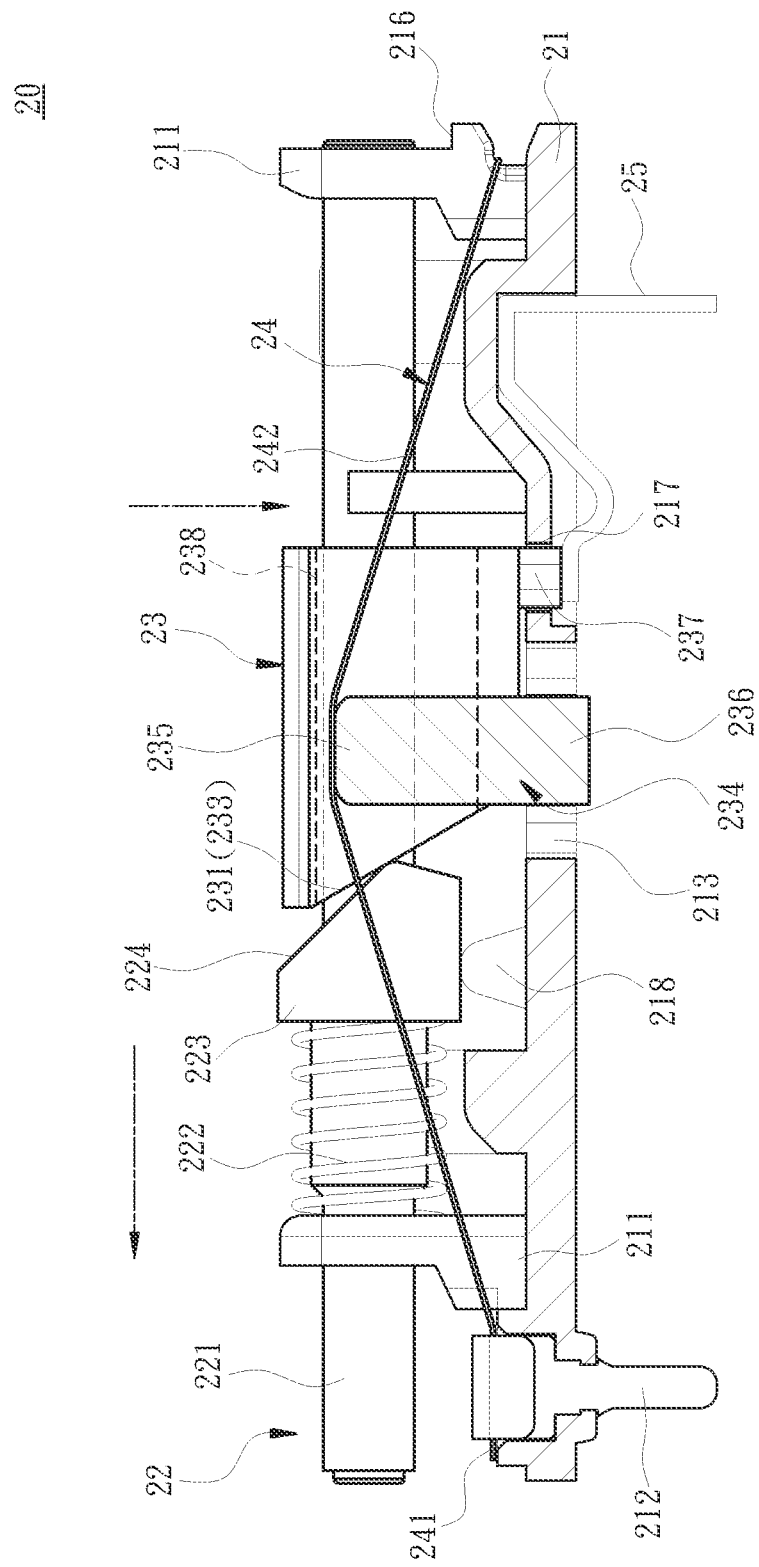
FIG. 7 is a structural schematic diagram after the air piston acts in one embodiment of the air valve of the present invention.

With reference to FIG. 3 and FIG. 4, in another aspect, the SMA wire 24 comprises two connecting segments 241, two actuating segments 242 and a turning segment 243. The two connecting segments 241 are respectively connected with the two conduction components 212, the two actuating segments 242 respectively extend from the two connecting segments 241 to connect with the two first side edges 232 of the driving component 23. The turning segment 243 is connected with the two actuating segments 242 and located on one of the two supporting blocks 211 distant from the two conduction components 212, and the turning segment 243 is turned by the one of the two supporting blocks 211. For example, by taking one of the two connecting segments 241 as a starting point, the SMA wire 24 is sequentially composed of one of the two connecting segments 241, one of the two actuating segments 242, the turning segment 243, the other one of the two actuating segments 242 and the other one of the two connecting segments 241. The state of the SMA wire 24 is changed when the SMA wire 24 is electrified (conducted), the two actuating segments 242 apply an actuating force to the driving component 23 connected so that the driving component 23 is displaced. The driving component 23 is only displaced towards a direction of approaching to a bottom surface of the base 21 due to a limitation of a structure (as shown in FIG. 7), and a movement direction of the rod body 221 is limited by the two supporting blocks 211. When the first triggering part 223 of the rod body 221 is pushed by the second triggering part 231, the movement direction of the rod body 221 is limited by the two supporting blocks 211, such that a displacement of the rod body 221 is in a different direction from the driving component 23. Further, a direction that the driving component 23 applies the actuating force to the air piston 22 is staggered with the axial direction of the air piston 22, and namely, a movement direction of the driving component 23 is different from the axial direction of the air piston 22 (as shown in FIG. 7) due to the first triggering part 223 and the second triggering part 231. Furthermore, the ventilation state of at least one of the two air holes 301 is switched by the displacement of the rod body 221. Additionally, the present invention utilizes the SMA wire 24 to generate an actuating force provided by two conventional SMA wires, as well as reduces an impact on the SMA wire 24 when an air passes through.

Figure 5:
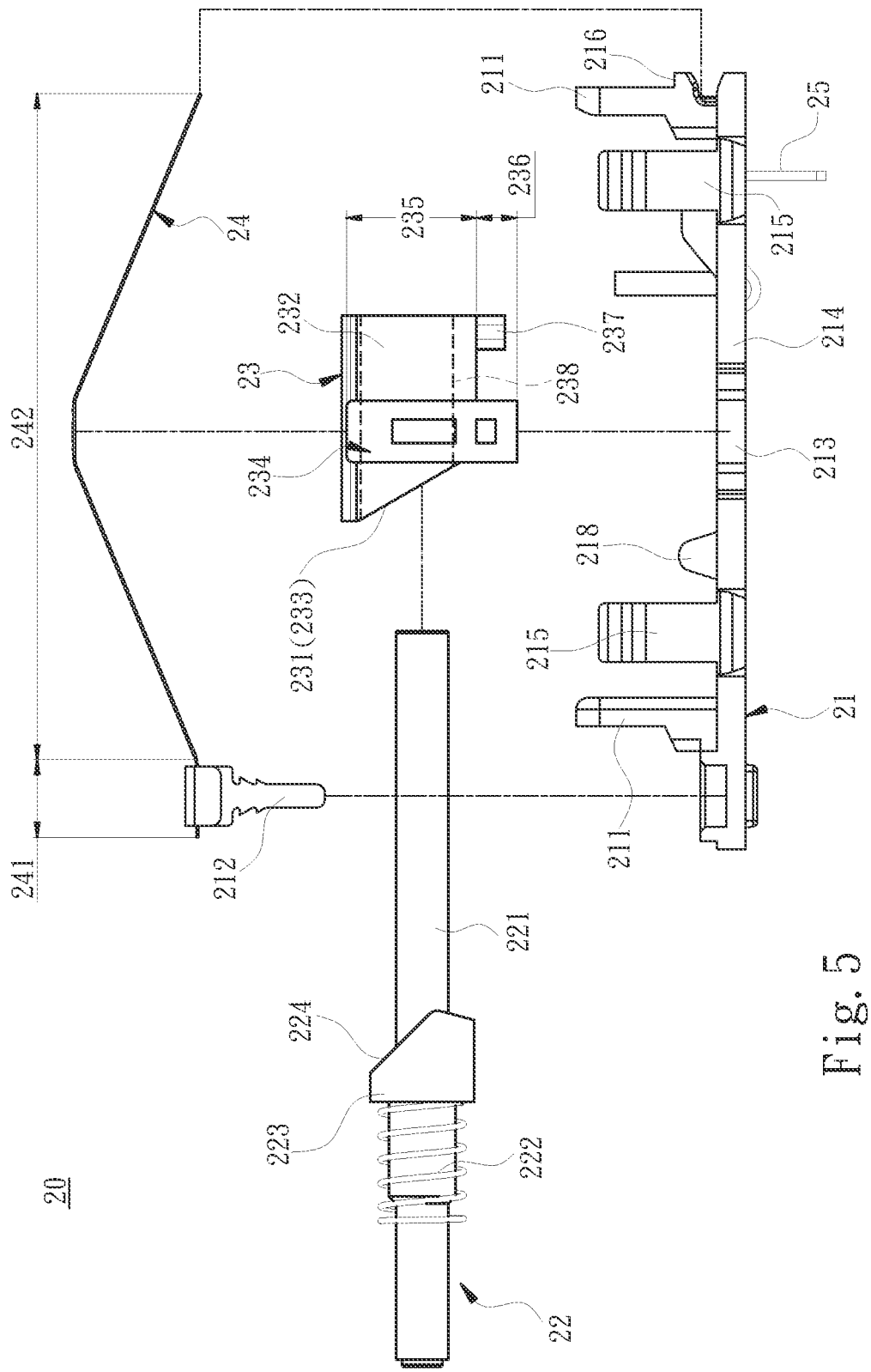
FIG. 5 is a side-view exploded view of a structure in one embodiment of the air valve of the present invention.
Figure 6:
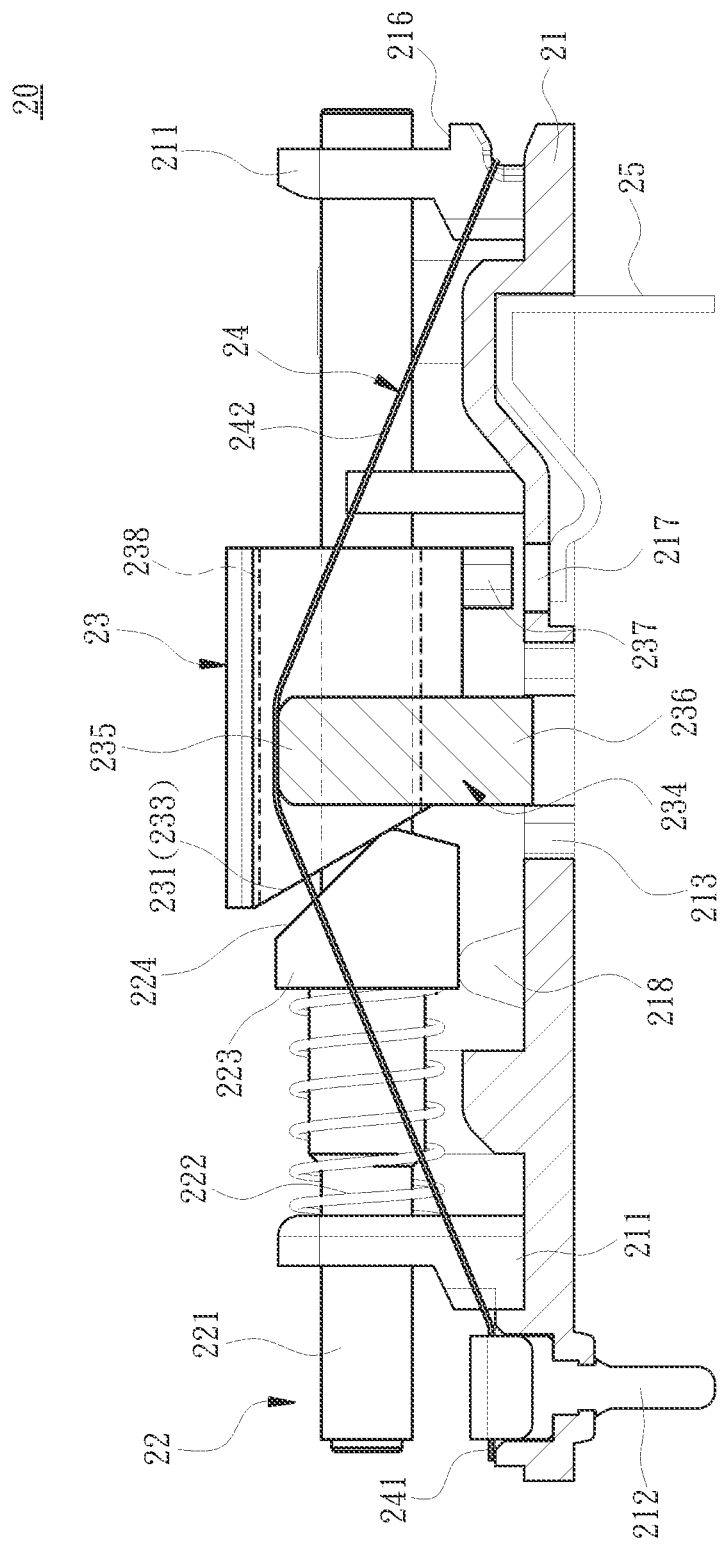
FIG. 6 is a structural schematic diagram before an air piston acts in one embodiment of the air valve of the present invention.

With reference to FIG. 4, FIG. 5 and FIG. 6, in one embodiment, the rod body 221 is provided with a first inclined plane 224 arranged on the first triggering part 223, and the second triggering part 231 is provided with a second inclined plane 233 which is in contact with the first inclined plane 224. The first triggering part 223 is in contact with the second inclined plane 233 of the second triggering part 231 through the first inclined plane 224. By taking an example, the base 21 is a bottom of the structure, the second inclined plane 233 of the second triggering part 231 is located above the first inclined plane 224 of the first triggering part 223. Further, an inclination of the first inclined plane 224 is not limited to being the same as an inclination of the second inclined plane 233; and in one embodiment, the inclination of the second inclined plane 233 is greater than that of the first inclined plane 224.

With reference to FIG. 5, FIG. 6 and FIG. 7, in one embodiment, the driving component 23 is provided with two connecting arms 234 arranged on the two first side edges 232, and the two actuating segments 242 of the SMA wire 24 are respectively arranged on the two connecting arms 234. Further, a portion that each of the two actuating segments 242 is in contact with each of the two connecting arms 234 serves as an action point that applying the actuating force to the driving component 23. In one embodiment, each of the two connecting arms 234 comprises a first part 235 located at one of the two first side edges 232, and a second part 236 extending from the first part 235 and being displaced along the edge of the base 21 when the driving component 23 moves; and a displacement trajectory of the driving component 23 is sustained through two second parts 236 of the two connecting arms 234. Additionally, in order to implement the air valve 20 by a smaller occupied volume, in one embodiment, the base 21 is provided with two notches 213 formed in projecting positions of the two connecting arms 234.

Figure 2:
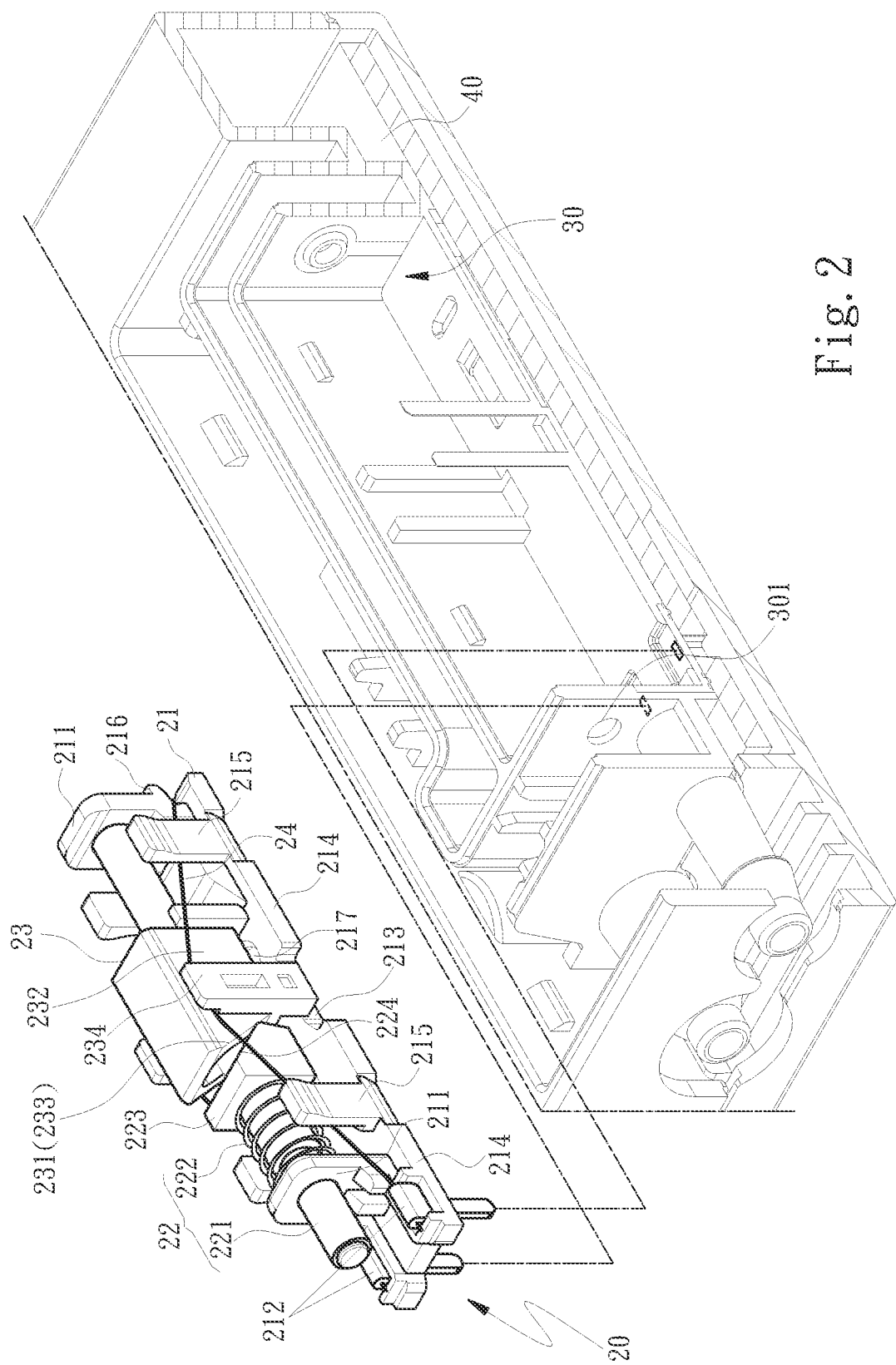
FIG. 2 is an exploded view of an implementation structure in one embodiment of the air valve of the present invention.

With reference to FIG. 2, FIG. 3 and FIG. 4, in one embodiment, the base 21 is provided with two second side edges 214 that are parallel to the air piston 22, and a plurality of auxiliary walls 215 arranged on the two second side edges 214 respectively, wherein the two actuating segments 242 of the SMA wire 24 are respectively located at one side that each of the auxiliary walls 215 facing to the air piston 22.

With reference to FIG. 2, FIG. 4 and FIG. 5, in one embodiment, one of the two supporting blocks 211, which is opposite to the two conduction components 212, is provided with a limiting bump 216 used for limiting the position of the turning segment 243 of the SMA wire 24.

With reference to FIG. 2 and FIG. 5, FIG. 6 and FIG. 7, in one embodiment, the air valve 20 is provided with a reed 25 located at one side of the base 21. The base 21 is provided with an opening 217 formed correspondingly to the reed 25; and the driving component 23 is provided with a column 237 facing to the opening 217. When the driving component 23 is pushed by the actuating force to be displaced, the column 237 compresses the reed 25 through the opening 217. Additionally, the reed 25 can be arranged correspondingly to an electrical connecting point (not shown in the figures) on a circuit board 40; and when the reed 25 is compressed, the reed 25 is in contact with the electrical connecting point to generate an electrical signal, and the electrical signal can be provided for a control module to monitor the work of the air valve 20.

With reference to FIG. 4, in one embodiment, the driving component 23 is provided with a space 238 for disposal of the rod body 221 therein, and a cross section of the space 238 is a rectangle.

With reference to FIG. 5, FIG. 6 and FIG. 7, in one embodiment, the base 21 is provided with a bump 218 for supporting the first triggering part 223; and for limiting the first triggering part 223 not to move to the direction close to the base 21.

What is claimed is:

1. An air valve with shape memory alloy (SMA) for switching, which is located in an air chamber where at least two air holes are formed, comprising:
   a base, provided with at least two supporting blocks arranged at an interval, and two conduction components located at the same side of the base and near one of the two supporting blocks;
   an air piston, arranged at the air chamber along an axial direction and used for determining a ventilation state of at least one of the two air holes, the air piston comprising a rod body arranged on the two supporting blocks, and a spring sleeved on the rod body, wherein the rod body is provided with a first triggering part, one end of the spring pushes against one of the two supporting blocks, and the other end of the spring pushes against the rod body;
   a driving component, sleeved on the rod body and provided with a second triggering part matched with the first triggering part; and
   an SMA wire, comprising two connecting segments respectively connected with the two conduction components, two actuating segments respectively extending from the two connecting segments and connected with the driving component, and a turning segment connected with the two actuating segments and turned by one of the two supporting blocks, which is opposite to the two conduction components, wherein when the SMA wire is electrified, the SMA wire applies actuating force to the driving component; the direction of the actuating force is staggered with the axial direction of the air piston; and the air piston generates displacement due to an action of the driving component, so as to switch the ventilation state of at least one of the two air holes.

2. The air valve according to claim 1, wherein the rod body is provided with a first inclined plane arranged on the first triggering part, and the second triggering part is provided with a second inclined plane which is in contact with the first inclined plane.

3. The air valve according to claim 2, wherein the driving component is provided with two first side edges that are parallel to the air piston and two connecting arms arranged on the two first side edges, and the two actuating segments of the SMA wire are arranged on the two connecting arms respectively.

4. The air valve according to claim 3, wherein each of the two connecting arms comprises a first part located at one of the two first side edges, and a second part extending from the first part and being displaced along the edge of the base when the driving component moves.

5. The air valve according to claim 4, wherein the base is provided with two notches formed in projecting positions of the two connecting arms.

6. The air valve according to claim 4, wherein the base is provided with two second side edges that are parallel to the air piston, and a plurality of auxiliary walls arranged on the two second side edges respectively; and the two actuating segments of the SMA wire are respectively located at one side of each of the auxiliary walls facing to the air piston.

7. The air valve according to claim 1, wherein one of the two supporting blocks, which is opposite to the two conduction components, is provided with a limiting bump used for limiting a position of the turning segment.

8. The air valve according to claim 1, wherein the air valve is provided with a reed located at one side of the base; the base is provided with an opening formed correspondingly to the reed; the driving component is provided with a column facing to the opening; and when the driving component accepts the actuating force and generates displacement, the column compresses the reed through the opening.

9. The air valve according to claim 1, wherein the driving component is provided with a space for disposal of the rod body therein, and a cross section of the space is a rectangle.

10. The air valve according to claim 1, wherein the base is provided with a bump for supporting the first triggering part.

* * * * *